United States Patent [19]

Kawamoto

[11] 4,346,626

[45] Aug. 31, 1982

[54] CONTROL DEVICE FOR AUTOMATIC TRANSMISSION

[75] Inventor: Mutsumi Kawamoto, Nagoya, Japan

[73] Assignee: Aisin-Warner K.K., Anjo Aichi, Japan

[21] Appl. No.: 106,376

[22] Filed: Dec. 21, 1979

[30] Foreign Application Priority Data

Dec. 27, 1978 [JP] Japan .................................. 53-164836
Apr. 11, 1979 [JP] Japan .................................. 54-43773

[51] Int. Cl.³ ........................ B60K 41/06; B60K 41/10
[52] U.S. Cl. ........................................ 74/866; 74/856; 74/861; 74/867; 74/869
[58] Field of Search ................. 74/843, 866, 867, 868, 74/869, 856, 861, 863, 864, 752 A

[56] References Cited

U.S. PATENT DOCUMENTS

| | | | |
|---|---|---|---|
| 3,525,275 | 8/1970 | Lemieux | 74/752 A X |
| 3,691,872 | 9/1972 | Schaefer | 74/864 |
| 3,709,064 | 1/1973 | Schaefer | 74/864 X |
| 3,709,066 | 1/1973 | Burcz | 74/864 |
| 3,724,292 | 4/1973 | Borman | 74/864 |
| 3,797,330 | 3/1974 | Ushijima | 74/752 A |
| 3,818,783 | 6/1974 | Norris et al. | 74/864 X |
| 3,823,621 | 7/1974 | Kubo et al. | 74/864 X |
| 3,832,915 | 9/1974 | Hiramatsu | 74/869 |
| 3,886,819 | 6/1975 | Lentz | 74/864 X |
| 3,938,409 | 2/1976 | Uozumi | 74/752 A |
| 3,943,799 | 3/1976 | Sakai et al. | 74/869 |
| 4,111,072 | 9/1978 | Harmon | 74/864 |
| 4,143,563 | 3/1979 | Shindo et al. | 74/869 |
| 4,145,937 | 3/1979 | Shindo et al. | 74/869 X |
| 4,148,232 | 4/1979 | Moriya | 74/869 |

FOREIGN PATENT DOCUMENTS 2018746 11/1970 Fed. Rep. of Germany ........ 74/864

Primary Examiner—Leslie Braun
Attorney, Agent, or Firm—Cooper, Dunham, Clark, Griffin & Moran

[57] ABSTRACT

The control device for automatic transmissions with an overdrive mechanism engages the brake of the overdrive mechanism while the shift control valve of the hydraulic control device is in the N-position (neutral), so that when the shift lever is shifted from the N-position to the D-position or R-position, the overdrive mechanism is momentarily set for overdrive thereby reducing shocks upon manually shifting.

7 Claims, 5 Drawing Figures

CONTROL DEVICE FOR AUTOMATIC TRANSMISSION

BACKGROUND OF THE INVENTION

1. Field of the Invention

This invention relates to a control device for automatic transmissions with an overdrive mechanism in automobiles and more particularly to a control device for automatic transmissions which reduces shocks produced when the manual lever is shifted from the natural (N) to the drive (D) or the reverse (R) positions.

2. Description of the Prior Art

Generally in automatic transmissions, when the manual lever is manually shifted from the N (neutral)-position to the D (drive)-position, an abrupt engagement of friction elements produces shocks. To prevent the shock in manual-shifting, there has been proposed a control device for automatic transmissions by which when the manual lever is shifted from the N-position to the D-position, the planetary gear set is momentarily shifted to the 2nd or 3rd gear. However, in the conventional automatic transmission, the overdrive mechanism has not been utilized to prevent the said manual shift shocks.

SUMMARY OF THE INVENTION

An object of this invention is to prevent shocks in effecting the N-D or N-R shift in the automatic transmission with an overdrive mechanism.

Another object of this invention is to alleviate an abrupt torque change transmitted by the planetary gear set when the manual lever is shifted from the N-position to the D-position or R-position.

These objects can be achieved by momentarily setting the overdrive mechanism to the overdrive on the said manual shifts. Furthermore, the undesirable delay of the shifting into overdrive is avoided by the overdrive brake being engaged while the shift lever is in the N-position.

DESCRIPTION OF THE PREFERRED EMBODIMENT

Figure 1:
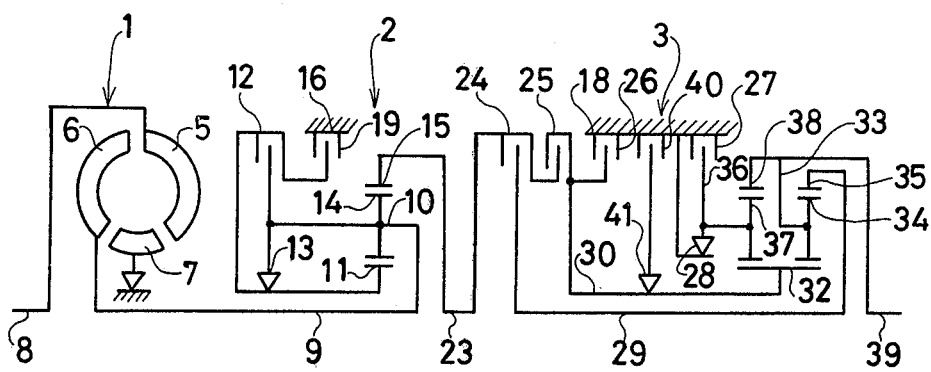
FIG. 1 is a schematic diagram of an automatic transmission with an overdrive mechanism.

FIG. 1 is a schematic diagram showing one example of a planetary gear unit of a hydro-dynamic four-speed automatic transmission with an overdrive mechanism. The planetary gear unit of this automatic transmission comprises a torque converter 1, an overdrive mechanism 2 and planetary gear sets 3 for three forward and one reverse gears, and is controlled by a hydraulic control device shown in FIG. 2. The torque converter 1 is of known construction consisting of a pump 5, a turbine 6 and a stator 7, with the pump 5 and the turbine 6 connected with an engine crank shaft 8 and a turbine shaft 9, respectively. The turbine shaft 9 constitutes an output shaft of the torque converter 1 as well as an input shaft of the overdrive mechanism 2 and is connected with a carrier 10 of a planetary gear set in the overdrive mechanism. A planetary pinion 14 rotatably supported on the carrier 10 is in mesh with a sun gear 11 and also with a ring gear 15. A multiple disk clutch 12 and a one-way clutch 13 are provided between the sun gear 11 and the carrier 10. Further, provided between the sun gear 11 and a housing or overdrive case 16 enclosing the overdrive mechanism 2 is a multiple disk brake 19.

The ring gear 15 of the overdrive mechanism 2 is connected with an input shaft 23 of the planetary gear sets 3 for three forward and one reverse gears. Multiple disk clutches 24 and 25 are provided between the input shaft 23 and an intermediate shaft 29 and between the input shaft 23 and a sun gear shaft 30, respectively. Provided between the sun gear shaft 30 and a transmission case 18 are multiple disk brakes 26, 40 and a one-way clutch 41. A sun gear 32 on the sun gear shaft 30 meshes with two planetary pinions 34 and 37 which are supported on carriers 33 and 36 and in mesh with ring gears 35 and 38, respectively, to form two rows of planetary gear systems. The ring gear 35 in one of the two planetary gear sets is connected to the intermediate shaft 29. The carrier 33 of this planetary gear set is connected with the ring gear 38 of the other planetary gear set, and these carrier and ring gears are both connected with the output shaft 39. Between the transmission case 18 and the carrier 36 of the latter planetary gear system are provided a multiple disk brake 27 and a one-way clutch 28.

Depending on the engine output and vehicle speed, the planetary gear unit of the automatic transmission with an overdrive mechanism locks and releases its clutches and brakes by means of the hydraulic control device which will be detailed in the following, to effect automatic gear-changing among four forward gears including an overdrive and manual shifting to a reverse-drive.

Table I shows the relation between the shift lever position and the condition of the clutches and brakes in the planetary gear unit.

In Table I, the clutches or brakes marked "O" are locked and those marked "X" are disengaged.

Figure 2:
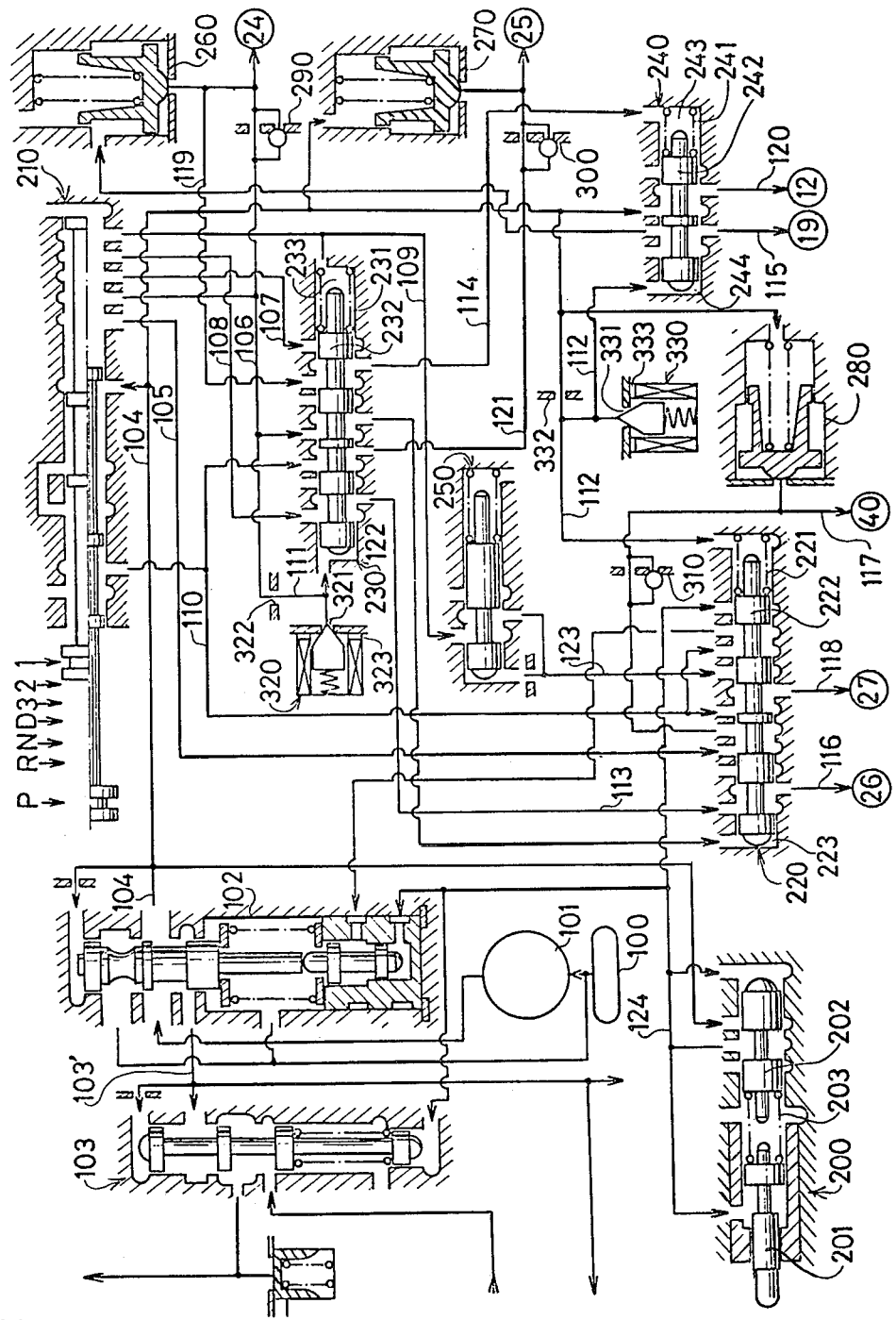
FIG. 2 is a hydraulic circuitry of a hydraulic control device.

Referring to FIG. 2 showing a hydraulic circuitry of the hydraulic control device, one embodiment of the hydraulic control device of this invention which performs automatic and manual gear-changing by selectively actuating the clutches 12, 24, 25 and brakes 19, 26, 27, 40 will now be explained.

TABLE I

| Shift position | Friction engagement means | | | | | | | | | |
|---|---|---|---|---|---|---|---|---|---|---|
| | Clutch 12 | Clutch 24 | Clutch 25 | Brake 19 | Brake 26 | Brake 27 | Brake 40 | One-way clutch 13 | One-way clutch 28 | One-way clutch 41 |
| Parking (P) | O | X | X | X | X | O | X | | | |
| Reverse (R) | O | X | O | X | X | O | X | Lock | Lock | |

TABLE I-continued

| Shift position | | Friction engagement means Clutch 12 | Clutch 24 | Clutch 25 | Brake 19 | Brake 26 | Brake 27 | Brake 40 | One-way clutch 13 | One-way clutch 28 | One-way clutch 41 |
|---|---|---|---|---|---|---|---|---|---|---|---|
| Neutral (N) | | O | X | X | X | X | X | X | | | |
| Forward drive | 1st | O | O | X | X | X | X | X | Lock | Lock | Over-run |
| D-range | 2nd | O | O | X | X | X | X | O | Lock | Over-run | Lock |
| | 3rd | O | O | O | X | X | X | O | Lock | Over-run | Over-run |
| | OD | X | O | O | O | X | X | O | Over-run | Over-run | Over-run |
| 3-range | 1st | O | O | X | X | X | X | X | Lock | Lock | Over-run |
| | 2nd | O | O | X | X | X | X | O | Lock | Over-run | Lock |
| | 3rd | O | O | O | X | X | X | O | Lock | Over-run | Over-run |
| 2-range | 1st | O | O | X | X | X | X | X | Lock | Lock | Over-run |
| | 2nd | O | O | X | X | O | X | O | Lock | Over-run | Lock |
| L-range | | O | O | X | X | X | O | X | Lock | Lock | Over-run |

The hydraulic circuit comprises: an oil reservoir 100, an oil pump 101, a pressure regulating valve 102, a second pressure regulating valve 103, a throttle valve 200, a manual valve 210, a 1-2 shift valve 220, a 2-3shift valve 230, a 3-4 shift valve 240, a low cost modulator valve 250 for regulating the hydraulic pressure supplied to the brake 27, an accumulator 260 for ensuring smooth engagement of the clutch 24, an accumulator 270 for ensuring smooth engagement of the clutch 25, an accumulator 280 for ensuring smooth engagement of the brake 40, flow control valves 290, 300, 310 with a check valve for controlling the flow of the pressurized oil to the clutches 24, 25 and the brake 27, a first solenoid valve 320 adapted to be opened or closed by outputs from an electric control circuit (computer) to control the 2-3 shift valve, a second solenoid valve 330 for controlling both the 1-2 shift valve and the 3-4 shift valve, and oil passages that connect various valves and hydraulic servoes of the clutches and brakes.

The pressure of oil pumped up from the oil reservoir 100 by the oil pump 101 is adjusted to a predetermined level (line pressure) by the pressure regulating valve 102 and the adjusted hydraulic pressure is then delivered to passages 104 and 103'. The hydraulic pressure supplied to the second pressure regulating valve 103 through the passage 103' is adjusted to a torque converter pressure, a lubricating oil pressure and a cooler pressure, depending on a throttle pressure of the throttle valve 200. The manual valve 210 that communicates to the passage 104 is connected to a manual shift lever and is shifted to one of the positions P, R, N, D, 3, 2 and L by manual operation of the shift lever. Table II shows how the passages 105–110 communicate to the passage 104 for each position of the shift lever. The mark "O" indicates the passage in communication with the passage 104.

TABLE II

| Shift lever position | P | R | N | D | 3 | 2 | L |
|---|---|---|---|---|---|---|---|
| Passage 105 | | | | O | O | O | O |
| Passage 106 | | | | | O | O | O |
| Passage 107 | | | | | | O | O |
| Passage 108 | | | | | | | O |

TABLE II-continued

| Shift lever position | P | R | N | D | 3 | 2 | L |
|---|---|---|---|---|---|---|---|
| Passage 109 | | | | | | | O |
| Passage 110 | | O | | | | | |

When deenergized, the first solenoid valve 320 that controls the 2-3 shift valve 230 closes a port 321 to supply the line pressure in the passage 111 which communicates to the passage 106 through an orifice 322 and, when energized, it opens the port 321 to discharge the oil pressure from the passage 111 through the drain port 323. The second solenoid valve 330 that controls the 1-2 shift valve 220 and the 3-4 shift valve 240 closes the port 331, when deenergized, to develop the line pressure in the passage 112 communicating to the passage 104 through an orifice 332 and, when energized, it opens the port 331 to exhaust the oil pressure from the passage 112 through the drain port 333. Table III shows the relation between the gear of the automatic transmission and the condition of the first and second solenoid valves 320 and 330 which are controlled by the electric control circuit to be described later.

TABLE III

| Shift Control valve position | N | D | | | |
|---|---|---|---|---|---|
| Gear stage | | 1st gear | 2nd gear | 3rd gear | 4th gear |
| 1st solenoid valve 320 | de-energized | energized | energized | de-energized | de-energozed |
| 2nd solenoid valve 330 | de-energized | energized | de-energized | energized | de-energized |

The 1-2 shift valve 220 is provided with a spool 222 having a spring 221 thrusting against one end thereof. At the first gear, the solenoid valve 330 is energized to discharge the line pressure from the passage 112 so that the spool 222 is held at the right-hand position by the hydraulic pressure supplied to the left-hand oil chamber 223 by way of the passage 113. At the second gear, the solenoid valve 330 is deenergized to conduct the line pressure to the passage 112 thereby stroking the spool 222 toward the left. At the third and fourth gear, the spool 232 of the 2-3 shift valve 230 is pushed toward the right to discharge the pressure in the left-hand chamber 223 through the passage 113 so that the spool 222 is displaced to the left-hand position.

The 2-3 shift valve 230 is provided with a spool 232 having a spring 231 thrusting against one end thereof. In the first and second gears, the solenoid valve 320 is energized and no line pressure is present in the passage 111 so that the spool 232 is held at the left-hand position by the action of the spring 231. At the third and fourth gears, the solenoid valve 320 is deenergized raising the line pressure in the passage 111, which in turn causes the spool to move toward the right.

The 3-4 shift valve 240 is provided with a spool 242 having a spring 241 thrusting against one end thereof. At the first and second speed stages, the line pressure is conducted into the oil chamber 243 through the passage 114 to hold the spool 242 at the left-hand position. The line pressure is exhausted from the passage 114 at the third and fourth gears. At the 3rd gear, since the solenoid valve 330 is energized and there is no line pressure in the passage 112, the spring 241 causes the spool 242 to move to the left. At the 4th gear, the solenoid valve 330 is deenergized to develop the line pressure in the passage 112 thereby displacing the spool 242 toward the right.

A throttle pressure is developed in the passage 124 by the throttle valve 200 whose indicator valve 201 is displaced in accordance with the stroke of the accelerator pedal and compresses a spring 203 interposed between the indicator valve 201 and a valve spool 202.

When the manual valve 210 is set at the N-position, the solenoid valve 330 is deenergized to produce in the passage 112 the line pressure which is applied to the left-hand oil chamber 244 causing the spool 242 to move toward the right. The passage 104 is then connected to the passage 115 through the 3-4 shift valve 240 and the passage 120 is connected to the drain port with the result that the brake 19 becomes engaged and the clutch 12 released, thereby engaging the overdrive gear in the overdrive mechanism 2.

Figure 3:
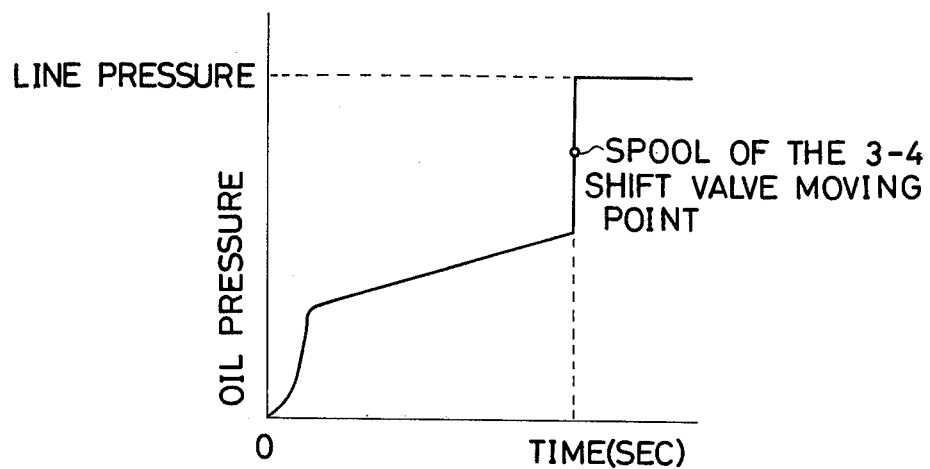
FIG. 3 is a graph showing variation in the hydraulic pressure supplied to the chamber of a 3-4 shift valve when the N-D shift is effected.

When the manual valve 210 is manually shifted to the D-position, the line pressure develops in the passage 106 and the pressure supplied to the clutch 24 increases, as shown in FIG. 3, due to the action of the flow control valve 290 and the accumulator 260. At the same time, the same hydraulic pressure as shown in FIG. 3 is conducted into the right-hand oil chamber 243 of the 3-4 shift valve 240 by way of the passage 119 branching from the passage 106, the 2-3 shift valve 230 with its spool 232 positioned at the left-hand side, and the passage 114. As a result, in effecting the N-D shift, the overdrive gear is kept engaged in the overdrive mechanism 2 for about one second until the pressure to the clutch 24 reaches the line pressure and the planetary gear mechanism 3 is geared to the 1st gear. When one second elapses after the N-D shift, the pressure in the chamber 243 becomes high enough, as shown in FIG. 3, to displace the spool 242 toward the left, with the result that the passage 120 is connected to the passage 104 introducing the line pressure to the clutch 12 and the pressure in the passage 115 is discharged. This causes the clutch 12 to be locked and the brake 19 to disengage and the overdrive mechanism 2 is locked up. The planetary gear unit is then set to the ordinary 1st stage of speed. At the 1st gear since the spool 222 of the 1-2 shift valve 220 is set at the right-hand position, the passages 116, 117 leading to the brakes 26, 40 are relieved of pressure and the passage 118 leading to the brake 27 is not supplied the line pressure. Therefore, the brakes 26, 40, 27 are released. When the vehicle speed reaches a predetermined level, the computer outputs a signal to deenergize the solenoid valve 330 displacing the spool 222 of the 1-2 shift valve 220 toward the left, so that the line pressure is supplied to the brake 40 through the passages 105, 117 and the passage 118 is relieved of pressure. This causes the brake 40 to be locked and the gear is shifted to the 2nd gear. As the vehicle speed further increases and predetermined levels of vehicle speed and of throttle opening are reached, the solenoid valve 320 is deenergized by the computer to displace the spool 232 of the 2-3 shift valve 230, admitting the line pressure to the passages 106, 121 to lock the clutch 25 and at the same time causes the spool 222 of the 1-2 shift valve 220 to shift to the left-hand position. Thus, the gear-shifting to the 3rd gear is completed. In shifting to the 4th gear, the computer deenergizes the solenoid valve 330 to displace the spool 242 of the 3-4 shift valve toward the right discharging the line pressure from the passage 120 and supplying the line pressure to the passage 115. As a result, the clutch 12 becomes disengaged and the brake 19 locked, completing the gear-shifting to the 4th gear.

When the manual valve 210 is in the 3-position, the gear-shifting to 1st, 2nd and 3rd gears is performed in the same manner as when the manual valve is in the D-position. However, since the line pressure is supplied, by way of the passages 107, 114, to the right-hand chamber 243 of the 3-4 shift valve 240 to hold the spool 242 at the left-hand position, the shifting to the 4th gear is blocked. When the manual valve 210 is manually shifted from the D-position to the 3-position while the car is running at the 4th gear, the gear is immediately downshifted to the 3rd gear.

With the manual valve 210 set at the 2-position, the 1st gear is obtained in the same manner as when the manual valve is in the D-position. At the 2nd gear with the manual valve set at the 2-position, the line pressure is admitted to the passage 108, from which it is further led into the passages 122, 116 to engage the brake 26 and effect the engine brake. If the manual valve is manually shifted to the 2-position while the vehicle is running at the 3rd gear, the vehicle slows down to a certain speed, at which time the computer outputs a signal to energize the solenoid valve 320 thus performing the 3-2 downshift.

When the manual valve is shifted to the 1-position, the line pressure is allowed to flow to the passage 109 and into the right-hand chamber 233 of the 2-3 shift valve 230. This causes the spool 232 to move to the left and immediately effects the 4-2 or 3-2 downshift. The 2-1 downshift is effected when the vehicle speed decreases to a predetermined level and the solenoid valve 330 is deenergized by an output from the computer. At this time, the line pressure in the passage 109 acts upon the brake 27 through the passages 123, 118 and engages it.

Referring to the block diagram shown in FIG. 4, the electric control circuit (computer) which opens and closes the first and second solenoid valves 320, 330, as shown in Table III, in accordance with the running condition of the vehicle, will now be explained.

The electric control circuit comprises a power unit 420 and a computer circuit 400 which actuates the solenoid valves 320, 330 according to signals received from a vehicle speed and throttle opening degree detecting device. The power unit 420 is connected through a switch 421 to a battery. The power unit includes a position switch 422 fitted to the manual lever and connected to a position setting (D, 3, 2 and L-position) device through wiring 520, and a power supply (a constant voltage source supplying unit) 423 connected to the position switch 422 through wiring 521. The power unit 420 supplies constant voltages from the power supply 423 to various component elements of the computer circuit 400 through wiring 523. The computer circuit 400 comprises a vehicle speed detection device 401, a waveform amplifying and shaping circuit 402, a digital-analog conversion circuit 403, a throttle position switch 413, a throttle opening degree voltage generator circuit 414, a 1-2 shift detection circuit 404, a 2-3 shift detection circuit 406, a 3-4 shift detection circuit 408, hysteresis circuits 405, 407, 409, solenoid valves 320, 330, an open-close selection circuit 410 for the solenoid valve 320, another open-close selection circuit 412 for the solenoid valve 330, a N-D shift signal generator 415, a timer 411, and amplifiers 416, 417. The vehicle speed detected by the vehicle speed detection device 401 is converted into a sinusoidal wave signal which is further shaped and amplified by the waveform amplifying and shaping circuit 402 to form positive rectangular wave signals. The positive rectangular wave signals are converted by the digital-analog conversion circuit 403 into DC voltage signals in accordance with the vehicle speed. The throttle position switch 413 that detects the engine load condition comprises a variable resistor whose resistance varies according to the throttle opening degree. The signal generated by the throttle position switch 413 according to the throttle opening degree is converted into DC voltage by the throttle opening degree voltage generator circuit 414. The first voltage representing the vehicle speed and the second voltage representing the throttle opening degree are each supplied to the 1-2 shift detection circuit 404, the 2-3 shift detection circuit 406 and the 3-4 shift detection circuit 408. Each of these shift detection circuits compares the vehicle speed voltage signal with the throttle opening degree voltage signal in a comparing circuit such as a differential amplifying circuit to determine the condition for effecting 1-2, 2-3 or 3-4 shifting. The hysteresis circuits 405, 407, 409 give conditions for effecting 2-1, 3-2 and 4-3 downshifts, respectively, and are arranged such that the downshift is effected at a lower speed than when the gear is upshifted so as to prevent hunting in a speed range of gear-shifting. In response to the output from the 2-3 shift detection circuit, the open-close selection circuit 410 for the solenoid valve 320 outputs on-off signals to open or close the solenoid valve 320 through the amplifier 416. The open-close selection circuit 412 for the solenoid valve 330 outputs on-off signals in response to the outputs from the 1-2 shift detection circuit 404 and the 3-4 shift detection circuit 408 as well as the output from the N-D shift signal generator 415. The on-off signals outputted from the open-close selection circuit 412 is amplified by the amplifier 417 to open or close the solenoid valve 330.

In this embodiment, since the overdrive mechanism 2 is momentarily geared for overdrive for about one second when effecting the N-D shift, the torque transmitted from the engine output shaft to the transmission output shaft is reduced in the overdrive mechanism 2 in proportion to the increase in the transmission output shaft rotation speed. This ensures smooth N-D shifting without any jerking.

With the above embodiment, when the N-D shift is effected, the overdrive mechanism 2 is geared for overdrive for a predetermined time period and the planetary gear mechanism 3 is geared for the ordinary 1st gear. In this case, however, the planetary gear mechanism 3 can be geared for the 2nd or higher gear to better reduce shocks during the N-D shift.

Figure 4:
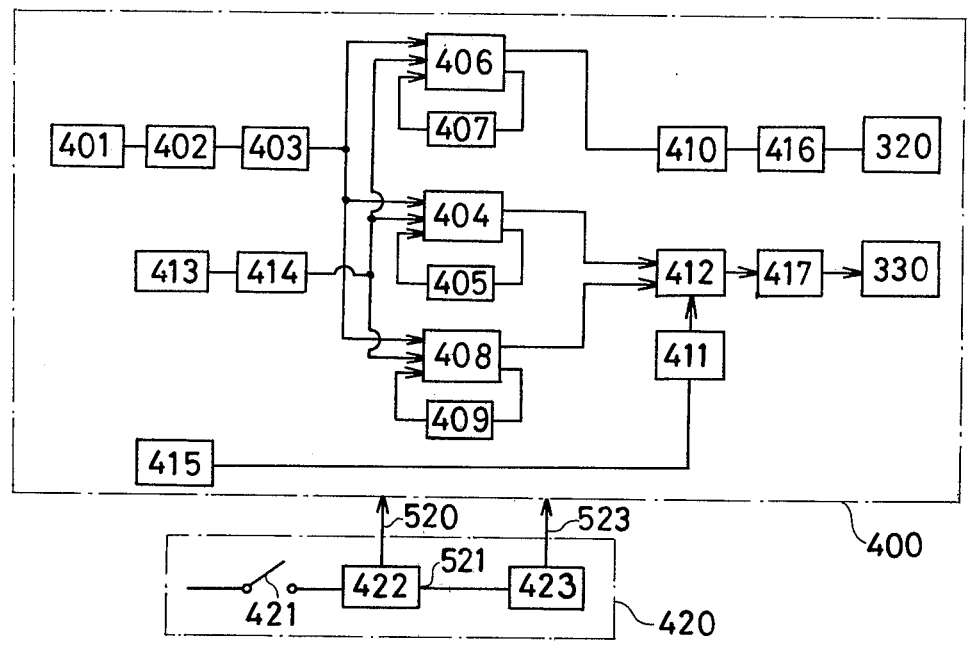
FIG. 4 is a block diagram showing construction of an electric control circuit.
Figure 5:
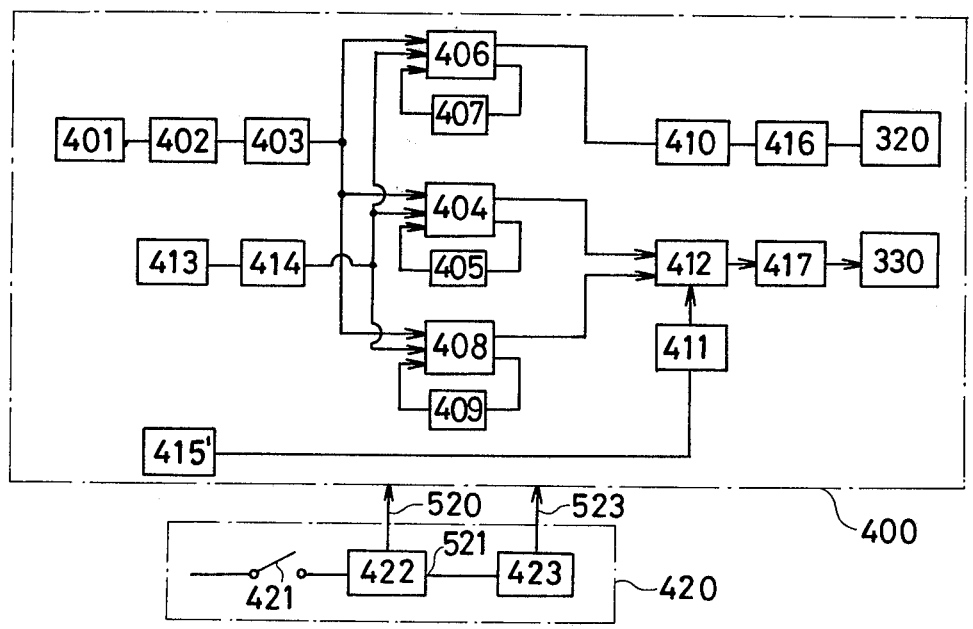
FIG. 5 is a block diagram for another electric control circuit.

FIG. 5 illustrates another embodiment of the electric control circuit which has a N-R shift signal generator 415' instead of the N-D shift signal generator 415 as shown in FIG. 4. The N-R shift signal generator 415' outputs a signal through the timer 411 to deenergize the solenoid valve 330 for about one second when the N-R shift is effected.

Referring to the hydraulic control circuit shown in FIG. 2, when the manual valve 210 is in the N-position, the solenoid valve 330 is deenergized to generate the line pressure in the passage 112 so that the left-hand side chamber 244 of the 3-4 shift valve 240 is supplied with line pressure to set the spool 242 to right-hand position. Then, the passage 104 communicates to the passage 115 through the 3-4 shift valve 240 and the passage 120 is connected to the drain port, causing the brake 19 to engage and the clutch 12 to disengage. Thus, the overdrive mechanism 2 is geared for overdrive.

If the manual valve 210 is manually shifted to the R-position, the line pressure is supplied to the passage 106 and the pressure applied to the clutch 24 increases, as shown in FIG. 3, by the action of the flow control valve 290 and the accumulator 260. The same hydraulic pressure as shown in FIG. 3 is supplied from the passage 119 branching from the passage 106 into the right-hand side oil chamber 243 of the 3-4 shift valve 240 by way of the 2-3 shift valve 230 with its spool 232 set at the left-hand position. Thus, when the N-R shift is effected, the overdrive mechanism 2 is geared to the overdrive for about one second and the planetary gear mechanism 3 is geared to the reverse drive. When one second elapses after the N-R shift has been performed, the pressure in the chamber 243 becomes high enough, as shown in FIG. 3, to move the spool 242 toward the left, supplying the line pressure from the passage 104 to the passage 120 and discharging the pressure from the passage 115. This causes the brake 19 to disengage and the clutch 12 to engage, so that the overdrive mechanism 2 is locked up and the planetary gear unit is geared to the ordinary reverse drive.

In this embodiment, since the overdrive mechanism 2 is geared to the overdrive for about one second after the N-R shift has been effected, the torque transmitted from the engine output shaft to the transmission output shaft is reduced in the overdrive mechanism 2 in proportion to the increases in the transmission output shaft rotation speed. This ensures smooth N-R shifting without any jerking.

What is claimed is:

1. A control device for an automatic transmission having a gear system provided with a plurality of friction engaging elements for providing torque corresponding to a plurality of gear ratios including an overdrive ratio to a transmission output shaft, comprising:
   a manual shift valve for manually selecting neutral, forward and reverse drive positions;

an electric control circuit comprising signal generating means for generating an electric signal in accordance with the vehicle running conditions and in accordance with the position selected for the manual shift valve, and a logic circuit for receiving said electric signal and generating an electric output signal corresponding to one of the gear ratios; and a hydraulic control system comprising a source of hydraulic pressure, hydraulic servo means to operate said plurality of friction engaging elements, a shift valve operable between first and second positions for receiving hydraulic pressure from said hydraulic pressure source and supplying hydraulic pressure to said hydraulic servo means through fluid passages, and a solenoid valve to control the position of said shift valve in response to the electric output signal of said electric control circuit, whereby said friction engaging elements associated with the overdrive ratio are engaged to provide torque to the transmission output shaft for a predetermined period of time when said manual shift lever is manually shifted from neutral to the forward or reverse drive position.

2. The control device of claim 1 wherein a friction engaging element associated with the overdrive ratio is engaged when said manual shift lever is manually shifted into neutral.

3. The control device of claim 2 wherein a brake associated with the overdrive ratio is engaged when said manual shift lever is manually shifted into neutral.

4. The control device of claim 2 wherein said shift valve is a 3-4 shift valve.

5. The control device of claim 2 further comprising hydraulic delaying means for delaying engagement of said friction engaging elements associated with forward and reverse drive ratios for a predetermined period of time when said manual shift valve is manually shifted from neutral to the forward or reverse drive position.

6. The control device of claim 5 wherein said hydraulic delaying means comprises an accumulator and a flow control valve.

7. The control device of claim 1 wherein said electric control circuit includes N-D and N-R signal generator means for generating an electric signal corresponding to the overdrive ratio for a predetermined period of time when the manual shift lever is manually shifted from neutral to the forward or reverse drive position.

* * * * *